United States Patent
Okuda et al.

(10) Patent No.: US 11,569,716 B2
(45) Date of Patent: Jan. 31, 2023

(54) COIL FORMING APPARATUS AND COIL FORMING METHOD

(71) Applicant: HONDA MOTOR CO., LTD., Tokyo (JP)

(72) Inventors: Shuhei Okuda, Tokyo (JP); Eishi Yoshida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/676,242

(22) Filed: Feb. 21, 2022

(65) Prior Publication Data
US 2022/0286027 A1    Sep. 8, 2022

(30) Foreign Application Priority Data
Mar. 8, 2021 (JP) .............................. JP2021-036704

(51) Int. Cl.
*H02K 15/04* (2006.01)
(52) U.S. Cl.
CPC ..... *H02K 15/0435* (2013.01); *H02K 15/0478* (2013.01); *Y10T 29/49009* (2015.01); *Y10T 29/53143* (2015.01)
(58) Field of Classification Search
CPC .............. H02K 15/04; H02K 15/0435; H02K 15/0478; H02K 15/06; H02K 15/062; H02K 15/063; H02K 15/065; H02K 15/066; H02K 15/08; H02K 15/085; H02K 15/09; H02K 15/095; Y10T 29/49009; Y10T 29/49071; Y10T 29/49073; Y10T 29/53143; Y10T 29/53157; Y10T 29/53161
See application file for complete search history.

(56) References Cited

U.S. PATENT DOCUMENTS

| | | | | |
|---|---|---|---|---|
| 2004/0261256 A1* | 12/2004 | Sadiku | ............... | H02K 15/0478 29/732 |
| 2009/0121576 A1* | 5/2009 | Even | ........................ | H02K 3/12 29/596 |
| 2010/0259124 A1* | 10/2010 | Bodin | .................. | H02K 15/066 29/596 |
| 2011/0000078 A1 | 1/2011 | Gorohata et al. | | |

(Continued)

FOREIGN PATENT DOCUMENTS

JP    4953032 B2    6/2012

*Primary Examiner* — Peter Dungba Vo
*Assistant Examiner* — Joshua D Anderson
(74) *Attorney, Agent, or Firm* — CKC & Partners Co., LLC

(57) ABSTRACT

A coil forming apparatus includes: a coil winding jig being configured to wind the belt-shaped coil by inserting the plurality of straight portions of the belt-shaped coil into a respective one of the plurality of comb-shaped grooves; a coil conveying mechanism that pivotally conveys the belt-shaped coil; and guide members that guide the belt-shaped coil in an arc shape while being in contact with the side ends of the belt-shaped coil, and further allow the plurality of straight portions to be inserted into a respective one of the plurality of comb-shaped grooves in a second half portion of the belt-shaped coil upon pivot conveying. The coil conveying organizer includes a conveying rail that provides a conveying path pivotally conveying the belt-shaped coil along the coil winding jig, and a conveyor that moves along the conveying rail in a state gripping the plurality of straight portions of the belt-shaped coil.

7 Claims, 12 Drawing Sheets

(56) References Cited

U.S. PATENT DOCUMENTS

2014/0196282 A1* 7/2014 Stephenson .......... H02K 15/064
  29/732
2017/0229936 A1* 8/2017 Kang ....................... H02K 3/12
2018/0367015 A1* 12/2018 Sadiku .................... B21C 47/02

* cited by examiner

COIL FORMING APPARATUS AND COIL FORMING METHOD

This application is based on and claims the benefit of priority from Japanese Patent Application No. 2021-036704, filed on 8 Mar. 2021, the content of which is incorporated herein by reference.

BACKGROUND OF THE INVENTION

Field of the Invention

The present invention relates to a coil forming apparatus and a coil forming method.

Related Art

A rotating electric machine includes a stator having a belt-shaped coil in a wound state. The belt-shaped coil is formed in advance in a substantially cylindrical wound state having a smaller diameter than the inner diameter of a stator core, and inserted into the stator core. The belt-shaped coil in the wound state expands inside the stator core, and is mounted by inserting the straight portion of the belt-shaped coil into the slot of the stator core.

It has been conventionally known that the belt-shaped coil is formed in the substantially cylindrical wound state by causing the core member to wind the belt-shaped coil while feeding the belt-shaped coil by one pitch, thereby forming the belt-shaped coil in the substantially wound shape (for example, refer to Japanese Patent No. 4953032).
Patent Document 1: Japanese Patent No. 4953032

SUMMARY OF THE INVENTION

When forming the coil into the wound state by winding the coil, it is important that a plurality of straight portions are wound accurately without positional deviation. In the above prior art, by inserting a preliminary alignment member between adjacent straight portions in a position immediately preceding the core member on the conveying path of the belt-shaped coil, the superposition of the immediately preceding portion to be wound on the core member is aligned.

However, in the above prior art, there is no specific disclosure of how to convey the belt-shaped coil to the core member to wind the belt-shaped coil. Moreover, in the above prior art, it is difficult to prevent the positional deviation of the straight portion of the belt-shaped coil wound on the core material.

It is an object of the present invention to provide a coil forming apparatus and a coil forming method capable of conveying a belt-shaped coil and easily forming the belt-shaped coil in a wound state without positional deviation of straight portions.

(1) A coil forming apparatus (for example, a coil forming apparatus 1 to be described later) according to an exemplary embodiment of the present invention which forms a belt-shaped coil (for example, a belt-shaped coil 100 to be described later) in a wound state, the belt-shaped coil including a plurality of straight portions (for example, straight portions 102 to be described later) and side ends (for example, side ends 103 to be described later) provided on both ends of the plurality of straight portions is provided, and the coil forming apparatus includes: a coil winding jig (a coil winding jig 2 to be described later) including a plurality of comb-shaped grooves (for example, comb-shaped grooves 23 to be described later), the coil winding jig being configured to wind the belt-shaped coil by inserting the plurality of straight portions of the belt-shaped coil into a respective one of the plurality of comb-shaped grooves; a coil conveying organizer (for example, a coil conveying mechanism unit 3 to be described later) that pivotally conveys the belt-shaped coil; and guide members (for example, guide members 4 to be described later) that are provided in a vicinity of both ends of the coil winding jig in an axial direction, and guide the belt-shaped coil in an arc shape while being in contact with the side ends of the belt-shaped coil, and further allow the plurality of straight portions to be inserted into a respective one of the plurality of comb-shaped grooves in a second half portion (for example, a second half portion 313b of a pivot conveying unit 313 to be described later) of the belt-shaped coil upon pivot conveying, in which the coil conveying mechanism includes a conveying rail (for example, a conveying rail 31 to be described later) that provides a conveying path pivotally conveying the belt-shaped coil along the coil winding jig, and a conveyor (for example, a conveyor 32 to be described later) that moves along the conveying rail in a state gripping the plurality of straight portions of the belt-shaped coil.

(2) In the coil forming apparatus according to (1) above, the conveyor includes a plurality of piece members (for example, piece members 33 to be described later) that may be stacked in a conveying direction (for example, a direction d2 to be described later) of the belt-shaped coil, and each may grip a respective one of the plurality of straight portions, and the plurality of piece members may be rotatably coupled to each other with a portion gripping the plurality of straight portions (for example, first gripping claws 333 and second gripping claws 336 to be described later) as a reference, accompanying pivot conveying of the belt-shaped coil.

(3) In the coil forming apparatus according to (2) above, the conveying rail may include guide grooves (for example, guide grooves 314 to be described later) that provide a travel path of the conveyor, and the plurality of piece members may each include guide projections (for example, guide projections 332 to be described later) which are engaged with a respective one of the guide grooves at an opposite end to the portion gripping the plurality of straight portions.

(4) In the coil forming apparatus according to any one of (1) to (3) above, the coil winding jig may include the plurality of comb-shaped grooves on an outer periphery of the coil winding jig, and the guide members may guide the belt-shaped coil in an arc shape having a smaller diameter than an outer diameter of the coil winding jig toward the second half portion of the belt-shaped coil upon pivot conveying, and allow the plurality of straight portions to be inserted into a respective one of the plurality of comb-shaped grooves in the second half portion of the belt-shaped coil upon pivot conveying.

(5) In the coil forming apparatus according to any one of (1) to (4) above, the guide members may each include a wall surface (for example, an inner wall surface 41 to be described later) to be in contact with the side end in the second half portion of the belt-shaped coil upon pivot conveyance.

(6) In the coil forming apparatus according to any one of (1) to (4) above, the guide members may each include an inner wall surface (for example, an inner wall surface 41 to be described later) to be in contact with the side end in an entire belt-shaped coil (for example, pivot conveying unit 313 to be described later) upon pivot conveyance.

(7) In the coil forming apparatus according to any one of (1) to (6) above, the guide members may include a reforming portion (for example, a reforming portion 42 to be described later) in a first half portion (for example, a first half portion 313a of a pivot conveying unit 313 to be described later) of the belt-shaped coil upon pivot conveying, and the reforming portion deforms and reforms the belt-shaped coil in an arc shape in a state sandwiching the side ends of the belt-shaped coil.

(8) A coil forming method for forming a belt-shaped coil (for example, a belt-shaped coil 100 to be described later) in a wound state according to an exemplary embodiment of the present invention is provided, and the belt-shaped coil including a plurality of straight portions (for example, straight portions 102 to be described later) and side ends (for example, side ends 103 to be described later) provided on both ends of the plurality of straight portions, and the method includes: a coil conveying step of pivotally conveying the belt-shaped coil along a coil winding jig (for example, a coil winding jig 2 to be described later) in a state gripping the plurality of straight portions, the coil winding jig including a plurality of comb-shaped grooves (for example, comb-shaped grooves 23 to be described later), each of which can hold a respective one of the plurality of straight portions therein, and being configured to wind the belt-shaped coil, and a guiding step of providing guide members (for example, guide members 4 to be described later) in a vicinity of both ends of the coil winding jig in an axial direction, guiding the belt-shaped coil so as to be in an arc shape while the guiding members are in contact with the side ends of the belt-shaped coil to be pivotally conveyed, and allowing the plurality of straight portions to be inserted into a respective one of the plurality of comb-shaped grooves of the coil winding jig.

(9) In the coil forming method according to (8) above, the coil winding jig may include the plurality of comb-shaped grooves on an outer periphery of the coil winding jig, and the guiding step may further include guiding the belt-shaped coil in an arc shape having a smaller diameter than an outer diameter of the coil winding jig toward the second half portion (for example, a second half portion 313b of the pivot conveying unit 313 to be described later) of the belt-shaped coil upon pivot conveying, and allowing the plurality of straight portions to be inserted into a respective one of the plurality of comb-shaped grooves in the second half portion of the belt-shaped coil upon pivot conveying.

(10) In the coil forming method according to (8) or (9) above, the guiding step may further include guiding the side ends by a wall surface (for example, an inner wall surface 41 to be described later) of each of the guide members in the second half portion of the belt-shaped coil upon pivot conveyance.

(11) In the coil forming method according to (8) or (9) above, the guiding step may further include guiding the side ends by a wall surface (for example, an inner wall surface 41 to be described later) of each of the guide members in an entire belt-shaped coil (for example, a pivot conveying unit 313 to be described later) upon pivot conveyance.

(12) In the coil forming method according to any one of (8) to (11) above, the guiding step may further include a reforming step of deforming and reforming the belt-shaped coil in an arc shape in a state sandwiching the side ends of the belt-shaped coil by the guide members in a first half portion (for example, a first half portion 313a of the pivot conveying unit 313 to be described later) of the belt-shaped coil upon pivot conveying.

According to the coil forming apparatus described in the above (1), it is possible to grip the straight portions without positional deviation of the straight portions and convey the belt-shaped coil toward the coil winding jig, and continuously insert the straight portions of the belt-shaped coil into the comb-shaped grooves of the coil winding jig while guiding the side ends of the belt-shaped coil by the guide members, thereby winding the belt-shaped coil on the coil winding jig. Therefore, it is possible to form the belt-shaped coil easily in a wound state.

According to the coil forming apparatus described in the above (2), since the plurality of piece members may be rotatably coupled to each other with the portion gripping the plurality of straight portions as a reference, it is possible to pivotally convey the belt-shaped coil in an arc shape smoothly.

According to the coil forming apparatus described in the above (3), it is possible to move the conveyor conveying the belt-shaped coil smoothly along the conveying rail by engaging the guide projections of the piece members of the conveyor with the guide grooves of the conveying rail, respectively.

According to the coil forming apparatus described in the above (4), since it is possible to guide the belt-shaped coil to allow the straight portions to be inserted into the comb-shaped grooves of the coil winding jig while guiding the side ends of the belt-shaped coil by the guide members, it is possible to insert the straight portions of the belt-shaped coil into the comb-shaped grooves of the coil winding jig smoothly.

According to the coil forming apparatus described in the above (5), since the side ends of the belt-shaped coil are guided to the comb-shaped grooves of the coil winding jig by the wall surface in the second half portion upon pivot conveying, it is possible to smoothly guide the straight portions of the belt-shaped coil to the comb-shaped grooves of the coil winding jig.

According to the coil forming apparatus described in the above (6), since the side ends of the belt-shaped coil are guided by the wall surface over the entire pivot conveyance, it is possible to guide the belt-shaped coil along the outer periphery of the coil winding jig, and smoothly guide the straight portions of the belt-shaped coil to the comb-shaped grooves of the coil winding jig.

According to the coil forming apparatus described in the above (7), since it is possible to reform the belt-shaped coil in an arc shape in the first half portion upon pivot conveying, prior to winding the belt-shaped coil on the coil winding jig, it is possible to form the belt-shaped coil accurately and easily in a wound state.

According to the coil forming method described in the above (8), it is possible to grip the straight portions without positional deviation of the straight portions and convey the belt-shaped coil toward the coil winding jig, and continuously insert the straight portions of the belt-shaped coil into the comb-shaped grooves of the coil winding jig, while guiding the side ends of the belt-shaped coil by the guide members, thereby winding the belt-shaped coil on the coil winding jig. Therefore, it is possible to form the belt-shaped coil easily in a wound state.

According to the coil forming method described in the above (9), since it is possible to guide the belt-shaped coil to allow the straight portions to be inserted into the comb-shaped grooves of the coil winding jig while guiding the side ends of the belt-shaped coil by the guide members, it is possible to insert the straight portions of the belt-shaped coil into the comb-shaped grooves of the coil winding jig smoothly.

According to the coil forming method described in the above (10), since it is possible to guide the side ends of the belt-shaped coil to the comb-shaped grooves of the coil winding jig by the wall surface in the second half portion upon the pivot conveyance, it is possible to smoothly guide the straight portions of the belt-shaped coil to the comb-shaped grooves of the coil winding jig.

According to the coil forming method described in the above (11), since it is possible to guide the side ends of the belt-shaped coil by the wall surface in the entire pivot conveyance, it is possible to smoothly guide the belt-shaped coil along the outer periphery of the coil winding jig, and smoothly guide the straight portions of the belt-shaped coil to the comb-shaped grooves of the coil winding jig.

According to the coil forming method described in the above (12), since it is possible to reform the belt-shaped coil in an arc shape in the first half portion upon pivot conveying, prior to winding the belt-shaped coil on the coil winding jig, it is possible to form the belt-shaped coil accurately and easily in a wound state.

DETAILED DESCRIPTION OF THE INVENTION

Figure 1:
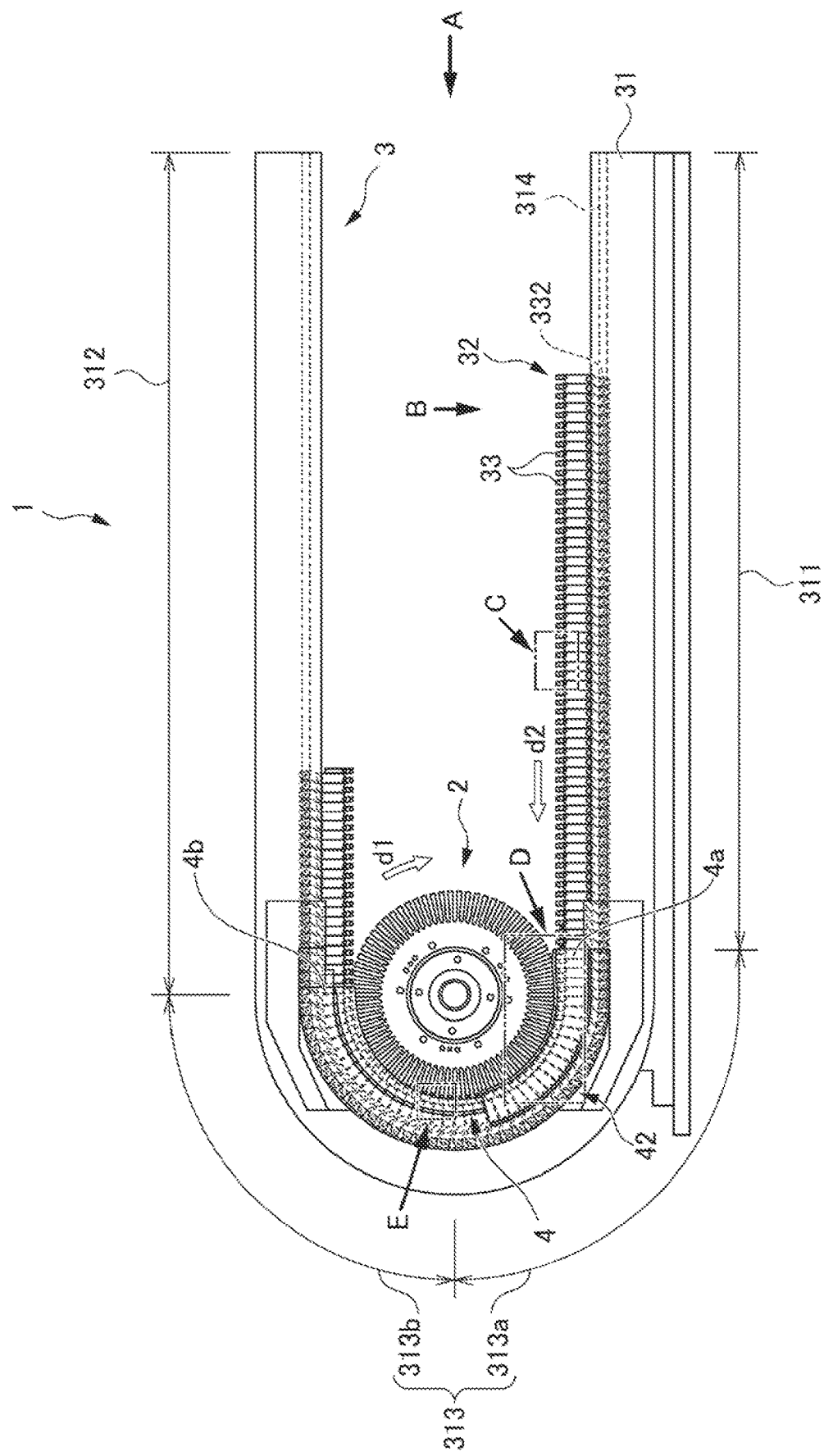
FIG. 1 is a side view showing an embodiment of a coil forming apparatus of the present invention.

Embodiments of the present invention will be described below. As shown in FIG. 1, a coil forming apparatus 1 of the present embodiment includes a coil winding jig 2, a coil conveying mechanism unit 3 that conveys a belt-shaped coil 100 along the outer periphery of the coil winding jig 2, and a pair of guide members 4 that guide the belt-shaped coil 100 to be conveyed by the coil conveying mechanism unit 3 so as to be wound by the coil winding jig 2.

Belt-Shaped Coil

Figure 3:
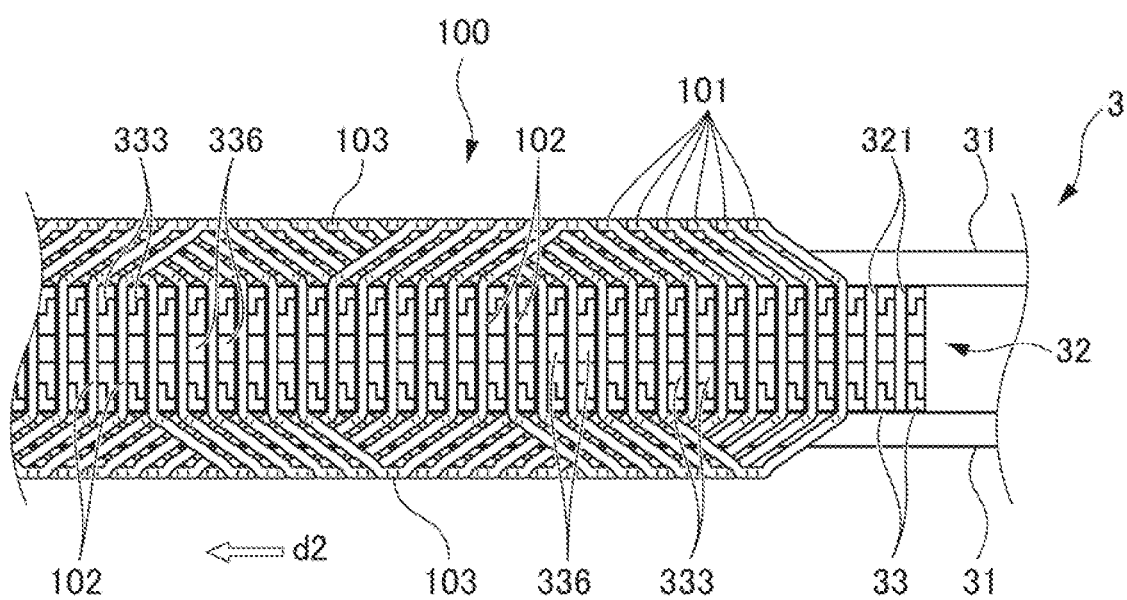
FIG. 3 is a view of the coil forming apparatus shown in FIG. 1 in the B direction in FIG. 1.

As shown in FIG. 3, the belt-shaped coil 100 is provided in an elongated corrugated belt shape with rectangular conductor wires 101 having a substantially rectangular cross-sectional shape. The rectangular conductor wire 101 is made of, for example, a highly conductive metal such as copper or aluminum.

The belt-shaped coil 100 includes a plurality of straight portions 102 and a plurality of side ends 103. The straight portions 102 are to be inserted into respective slots provided on the inner periphery of the stator core (not shown), and extend substantially straight in the same direction and are provided in parallel at regular intervals. The side ends 103 are each provided closer to the side edge of the belt-shaped coil 100 than the straight portions 102 are. More specifically, the side ends 103 are provided at both ends of the straight portions 102 in the extending direction. The side ends 103 couple adjacent straight portions 102 at the one end portions as well as the other end portions thereof in an alternating and mountain-shape like manner, and constitute coil end portions respectively projecting in the axial direction of the stator core from the slots when the belt-shaped coil 100 is mounted on the slots of the stator core.

The belt-shaped coil 100 of the present embodiment is provided in an elongated belt shape by arranging six rectangular conductor wires 101 in a manner in which the plurality of straight portions 102 are provided in parallel to each other at a constant interval, and the plurality of side ends 103 are shifted by the pitch of the straight portions 102 to be stacked. The six rectangular conductor wires 101 are provided by folding the plurality of straight portions and the plurality of side ends 103 respectively in a corrugated shape. The straight portions 102 of the belt-shaped coil 100 are stacked in the thickness direction (the vertical direction relative to the plane of the paper of FIG. 3) of the belt-shaped coil 100 by folding back the rectangular conductor wire 101 in the middle. The belt-shaped coil 100 of the present embodiment has a length that is wound four times around the coil winding jig 2 to be described later.

Coil Winding Jig

Figure 4:
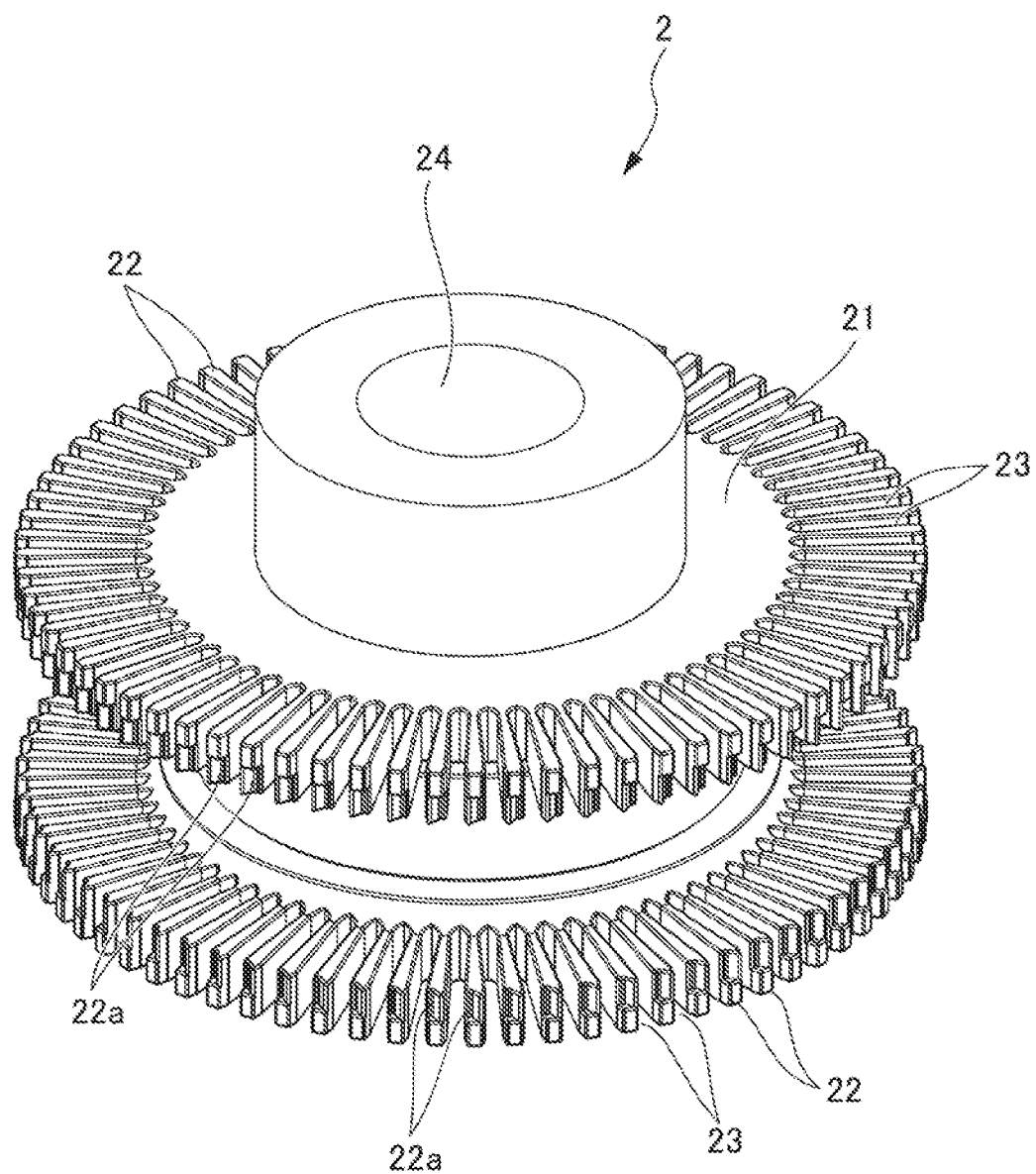
FIG. 4 is a perspective view showing an embodiment of a coil winding jig.

As shown in FIG. 4, the coil winding jig 2 includes a substantially cylindrical jig body 21, a plurality of comb teeth 22 protruding radially on the outer periphery of the jig body 21, a plurality of comb-shaped grooves 23 provided between the comb teeth 22 and 22 adjacent in the circumferential direction, and a shaft hole 24 which opens at the center of the jig body 21. The comb teeth 22 and comb-shaped groove 23 are respectively provided at both ends in the axial direction of the jig body 21. The comb teeth 22 and the comb-shaped grooves 23 at one end of the jig body 21 are aligned with the comb teeth 22 and the comb-shaped grooves 23 at the other end thereof. The coil winding jig 2 of the present embodiment include 72 pieces of comb-shaped grooves 23 respectively at both ends in the axial direction of the jig body 21. The number of comb-shaped grooves 23 corresponds to the number of slots of the stator core to which the belt-shaped coil 100 is mounted.

The separation distance between the comb tooth 22 and the comb-shaped groove 23 at one end of the jig body 21 and the comb tooth 22 and the comb-shaped groove 23 at the other end is substantially equal to the length in the extending direction of the straight portion 102 of the belt-shaped coil 100. Therefore, the straight portions 102 of the belt-shaped coil 100 can be accommodated over the comb-shaped groove 23 at the one end and the comb-shaped groove 23 at the other end of the jig body 21.

The coil winding jig 2 has an outer diameter defined by the position of the tip of the comb tooth 22 which is equal to or less than the inner diameter of the stator core, so that the coil winding jig 2 can be inserted into the inside of the stator core. The coil winding jig 2 is disposed at a predetermined portion of the coil forming apparatus 1, and is rotatable in the direction d1 indicated by the arrow in FIG. 1 about the shaft hole 24 by driving a motor (not shown).

Coil Conveying Mechanism Unit

Figure 2:
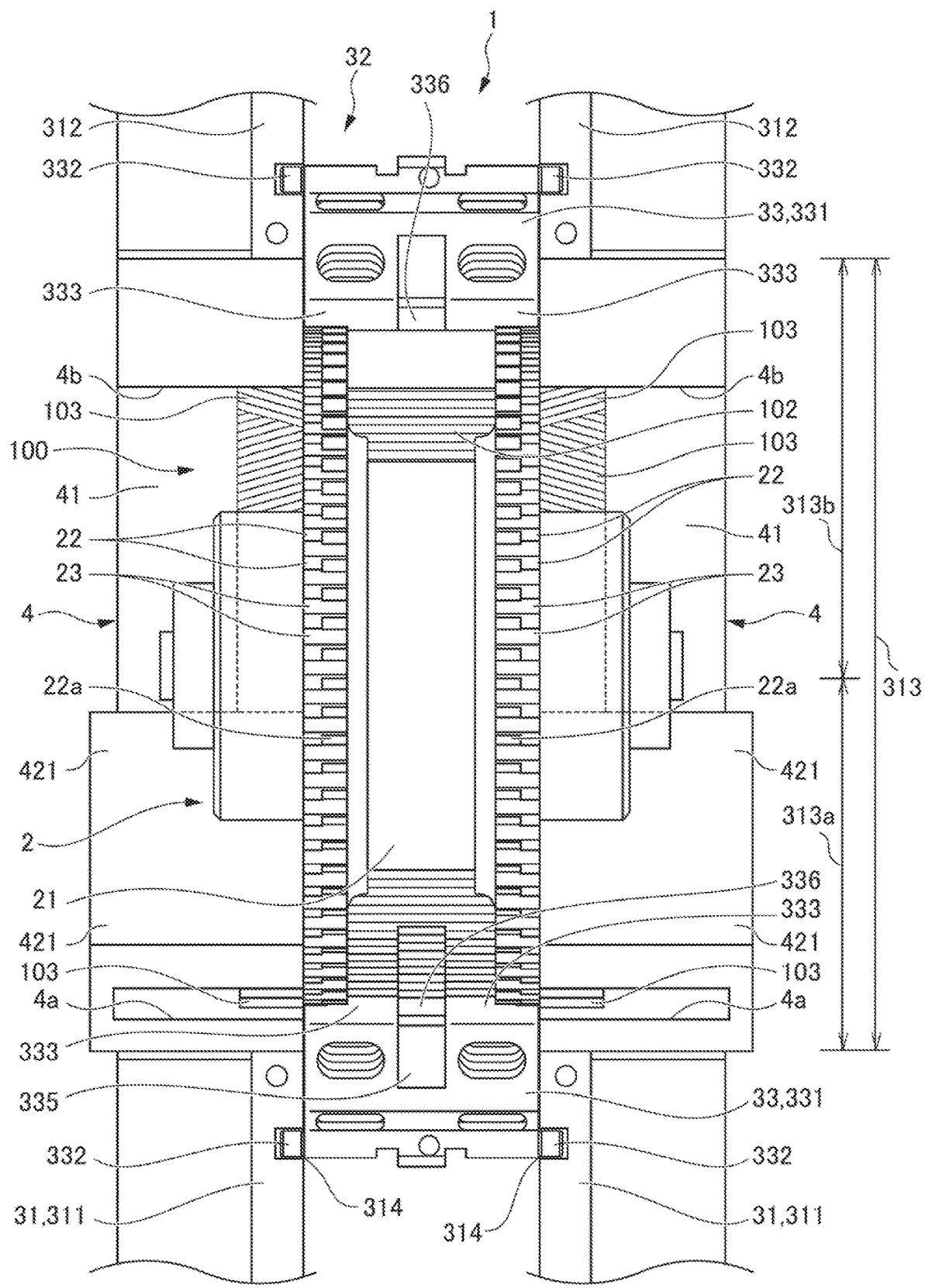
FIG. 2 is a view of the coil forming apparatus shown in FIG. 1 in the direction A in FIG. 1.

The coil conveying mechanism unit 3 is a coil conveying device which pivotally conveys the belt-shaped coil 100 along at least a portion of the outer periphery of the coil winding jig 2. More specifically, as shown in FIGS. 1 and 2, the coil conveying mechanism unit 3 includes a pair of conveying rails 31 constituting the conveying path of the belt-shaped coil 100, and a conveyor 32 that grips and conveys the belt-shaped coil 100 along the conveying rail 31.

The conveying rails 31 are each made from a metal belt-shaped plate material, and disposed in parallel to each other at an interval substantially equal to the length of the straight portion 102 of the belt-shaped coil 100 in the width direction of the coil forming apparatus 1. As shown in FIG. 2, the interval of the pair of conveying rails 31 is substantially equal to the separation distance in the axial direction of the comb tooth 22 and the comb-shaped groove 23 which disposed at both ends of the jig body 21 of the coil winding jig 2.

The conveying rails 31 each include a pair of parallel straight upper and lower conveying units 311 and 312 constituting a straight conveying path, and a pivot conveying unit 313 that connects the ends of the straight conveying units 311 and 312 to each other in an arc shape, thereby providing a lateral U-shaped conveying path. The pivot conveying unit 313 of the conveying rails 31 is provided along the outer periphery of the coil winding jig 2, such that the conveying rail 31 surrounds the coil winding jig 2, with the coil winding jig 2 disposed inside the U-shaped portion. As shown in FIG. 2, pairs of guide grooves 314 across the entire length of the conveyance rail 31 are provided on the faces on which the pair of conveying rails 31 are opposing each other. The guide grooves 314 provide a travel path of the conveyor 32, which will be described later.

In the present embodiment, the pivot conveying unit 313 of the coil conveying mechanism unit 3 is provided over a range of approximately ½ the outer periphery of the coil winding jig 2. The pivot conveying unit 313 includes a first half portion 313a on the introducing side of the belt-shaped coil 100 and a second half portion 313b on the discharging side of the belt-shaped coil 100. The first half portion 313a is provided over a range of approximately ½ the first half of the pivot conveying unit 313. The second half portion 313b is provided over a range of approximately ½ the second half of the pivot conveying unit 313. However, the pivoting conveying unit 313 may be configured to pivotally convey the belt-shaped coil 100 along at least a portion of the outer periphery of the coil winding jig 2.

The conveyor 32 extends long along the conveying rail 31 and can move along the conveying rail 31 between the pair of conveying rails 31. The conveyor 32 has a length corresponding to the total length of at least the belt-shaped coil 100, and moves along the conveying rail 31 in a state of holding the straight portions 102 of the belt-shaped coil 100 on the upper surface, thereby pivotally conveying the belt-shaped coil 100 along the outer periphery of the coil winding jig 2.

Figure 5:
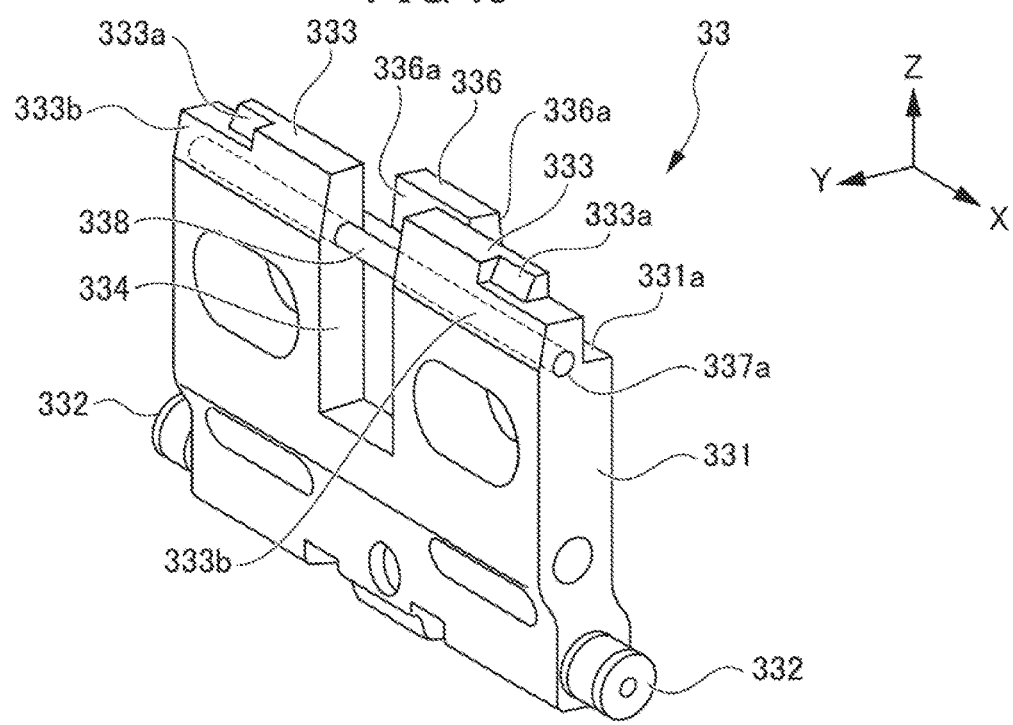
FIG. 5 is a perspective view showing a piece member of a grip portion of a coil conveying mechanism unit.
Figure 6:
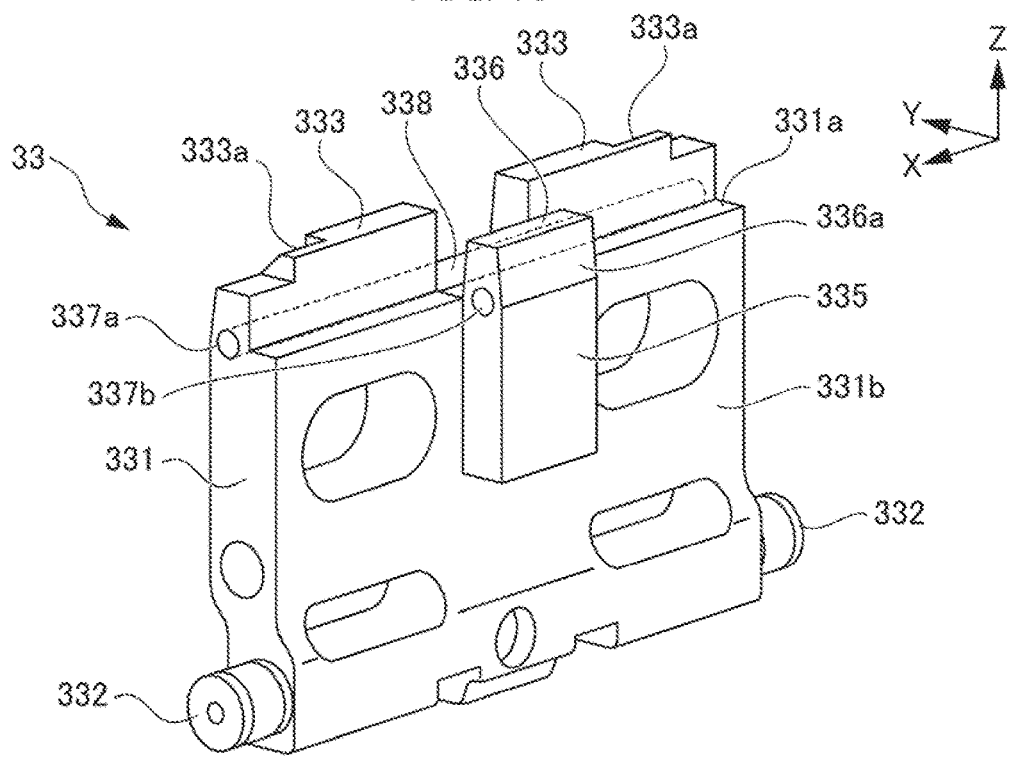
FIG. 6 is a perspective view showing the piece member of the grip portion of the coil conveying mechanism unit from the opposite side of FIG. 5.
Figure 7:
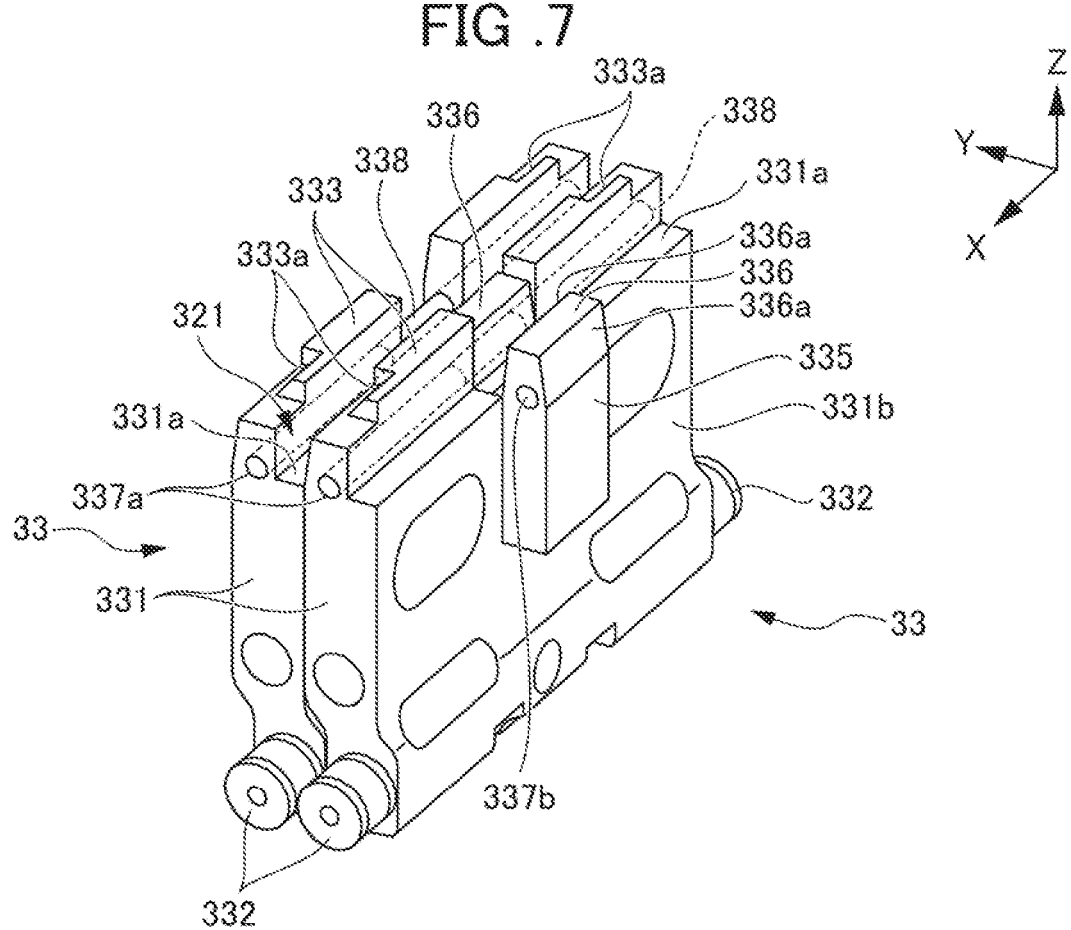
FIG. 7 is a perspective view showing a state in which two piece members are connected to each other.

As shown in FIGS. 1 and 3, the conveyor 32 includes a plurality of piece members 33 of the same structure arranged in a multilayer shape along the length direction of the belt-shaped coil 100. As shown in FIGS. 5, 6 and 7, the piece members 33 each include a piece member body 331 having a substantially rectangular plate-like shape made of metal, and a pair of guide projections 332 each projecting laterally from both ends in the width direction at the lower end of the piece member body 331. The guide projections 332 of the present embodiment each include a rotatable roller; however, they may be simple projections. In addition, regarding the directions of the piece member 33, in FIGS. 5, 6, and 7, the X direction is defined as the width direction, the Y direction is defined as the thickness direction, and the Z direction is defined as the height direction. In the height direction of the piece member 33, the upper direction in FIGS. 5, 6 and 7 is defined as "up", and the lower direction is defined as "down".

The piece member body 331 has a thickness substantially equal to the gap between adjacent straight portions 102 and 102 in the length direction of the belt-shaped coil 100. The piece member body 331 has an upper end surface 331a, and the upper end surface 331a includes a pair of first gripping claws 333 each projecting in the height direction. The first gripping claw 333 has a thickness of approximately ½ the thickness of the piece member body 331. The thickness of the first gripping claw 333 is substantially equal to the gap between the adjacent straight portions 102 and 102 of the belt-shaped coil 100. The first gripping claw 333 is provided at a position in the vicinity of one end in the thickness direction of the piece member body 331 on the upper end surface 331a. The pair of first gripping claws 333 are disposed apart from each other on both end sides in the width direction of the piece member body 331 with a predetermined interval therebetween.

The first gripping claws 333 each have an upper end surface, and the upper end surface includes a meshing groove 333a that meshes with a tip of the comb tooth 22 of the coil winding jig 2. More specifically, as shown in FIG. 4, the tip of the comb tooth 22 of the coil winding jig 2 has an engaging portion 22a. The meshing groove 333a has a position and a shape capable of meshing with the engaging portion 22a of the coil winding jig 2.

The first gripping claws 333 each have a tapered surface 333b on the side opposite to the side on which the upper end surface 331a is provided. The tapered surface 333b allows the first gripping claw 333 to be formed in a slightly tapered shape as it moves away from the piece member body 331.

The pair of first gripping claws 333 has a rectangular recess 334 along the height direction of the piece member body 331 provided therebetween. The recess 334 extends from the upper end surface 331a to the portion approximately ½ the height of the piece member body 331. The depth of the recess 334 along the thickness direction of the piece member body 331 has a depth of approximately ½ the thickness of the piece member body 331, similarly to the thickness of the first gripping claw 333.

The piece member body 331 includes a rectangular protrusion 335 provided on one side surface 331b. The protrusion 335 protrudes in a block shape toward a direction perpendicular to the side surface 331b from the side surface 331b which is opposite to the side where the first gripping claw 333 is provided, in the thickness direction of the piece member body 331. The protrusion 335 is provided above a site which is approximately ½ the height of the piece member body 331 in the height direction. The height of the protrusion 335 along the height direction of the piece member body 331 is substantially equal to the height of the recess 334. The thickness of the protrusion 335 along the thickness direction of the piece member body 331 is substantially equal to the depth of the recess 334.

The protrusion 335 include a second gripping claw 336 provided at an upper end portion of the protrusion 335. Similarly to the first gripping claws 333, the second gripping claw 336 projects upward from the upper end surface 331a of the piece member body 331. Similarly to the first gripping claws 333, the thickness of the second gripping claw 336 is substantially equal to the gap between the adjacent straight portions 102 and 102 of the belt-shaped coil 100. Since the second gripping claw 336 has the same width as the protrusion 335, as shown in FIG. 7, when the two piece members 33 and 33 are stacked with their directions aligned with each other, the second gripping claw 336 of the one piece member 33 is disposed between the pair of first gripping claws 333 and 333 of the other piece member 33.

The second gripping claw 336 has tapered surfaces 336a on both the side on which the upper end surface 331a is provided and the opposite side. These tapered surfaces 336a allow the second gripping claw 336 to be formed in a slightly tapered shape as it moves away from the piece member body 331.

As shown in FIG. 7, the plurality of piece members 33 are stacked so as to be aligned such that the first gripping claws 333 and the second gripping claws 336 are oriented in the same direction. The protrusions 335 of the piece member 33 are accommodated in the recess 334 of the adjacent piece member 33. As a result, the adjacent piece members 33 and 33 are in close contact with each other and stacked.

The piece member 33 includes through holes 337a extending in the width direction of the piece member 33. The through hole 337a is provided at a portion in the vicinity of the root of the first gripping claw 333 and substantially at the same height as the upper end surface 331a of the piece member body 331. In addition, the protrusion 335 includes a through hole 337b extending in the width direction of the protrusion 335. The through hole 337b is provided at a portion in the vicinity of the root of the second gripping claw 336 and substantially at the same height as the upper end surface 331a of the piece member body 331. As shown in FIG. 7, after the two piece members 33 and 33 are stacked, a shaft member 338 is inserted to span the through hole 337a and the through hole 337b which are in communication with each other. Thus, with the shaft member 338 as a rotation axis, the lower end sides of the plurality of pieces members 33 where the guide projections 332 are provided are coupled with each other in a rotatable (swingable) manner in the length direction of the conveyor 32, thereby forming an elongated conveyor 32.

Figure 8:
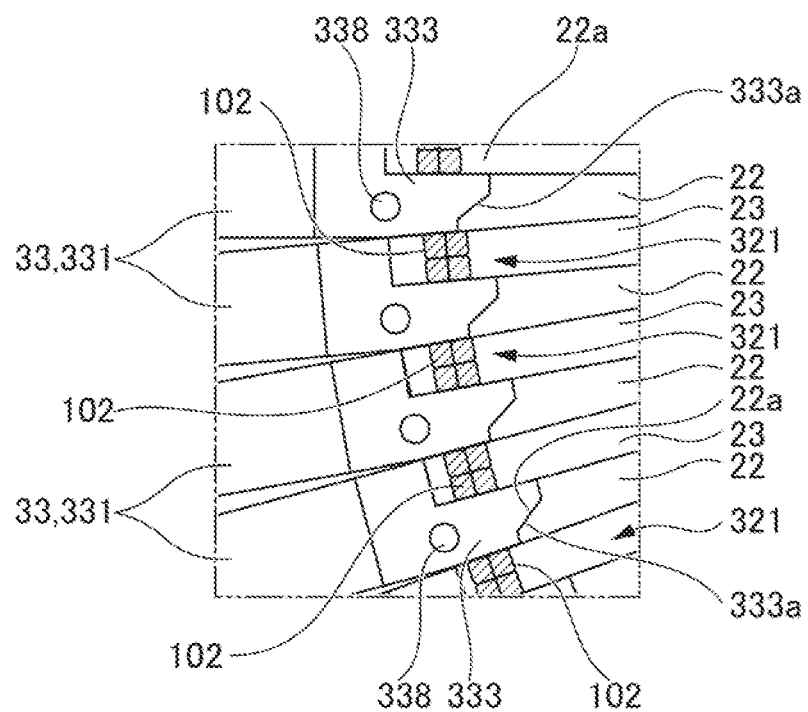
FIG. 8 is an enlarged view of a portion E in FIG. 1.

As shown in FIGS. 3, 7, 8, and 9, in the conveyor 32, gripping grooves 321 each gripping the straight portion 102 of the belt-shaped coil 100 is provided between the first gripping claws 333 and 333, and between the second gripping claws 336 and 336 of the adjacent piece members 33, 33. The upper end surface 331a of the piece member body 331 is provided at the bottom of the gripping groove 321. The gripping grooves 321 each have a groove width capable of accommodating the straight portion 102 of the belt-shaped coil 100. The groove width of the gripping groove 321 is substantially equal to the groove width along the circumferential direction of the comb-shaped groove 23 of the coil winding jig 2. The arrangement pitch of the gripping grooves 321 along the length direction of the conveyor 32 is substantially equal to the arrangement pitch of the comb-shaped groove 23 along the circumferential direction of the coil winding jig 2. Therefore, when the meshing groove 333a and the engaging portion 22a are engaged with each other, as shown in FIG. 8, the gripping groove 321 of the conveyor 32 and the comb-shaped groove 23 of the coil winding jig 2 are in communication with each other in the radial direction of the coil winding jig 2.

Each guide projection 332 of the piece member 33 is slidably accommodated in the guide groove 314 of the conveying rail 31. By this, the conveyor 32 disposes so as to protrude toward the inside of the U-shaped conveying rail 31. Furthermore, as shown in FIG. 8, the meshing groove 333a of the piece member 33 meshes with the engaging portion 22a of the coil winding jig 2 at the location immediately below the coil winding jig 2, such that the conveyor 32 is in synchronization with the rotation of the coil winding jig 2 by the rotation of the coil winding jig 2 in the direction d1 so as to be movable in the direction d2. When the conveyor 32 moves in an arc shape along the pivot conveying unit 313 of the conveying rail 31, the piece members 33 and 33 adjacent to each other rotate around the shaft member 338. At this time, the end of the guide projections 332 side of the piece members 33 and 33 adjacent to each other are isolated with the portions of the first gripping claw 333 and the second gripping claw 336 which are sites for gripping the straight portions 102 as references. Therefore, the conveyor 32 is smoothly movable.

Figure 9:
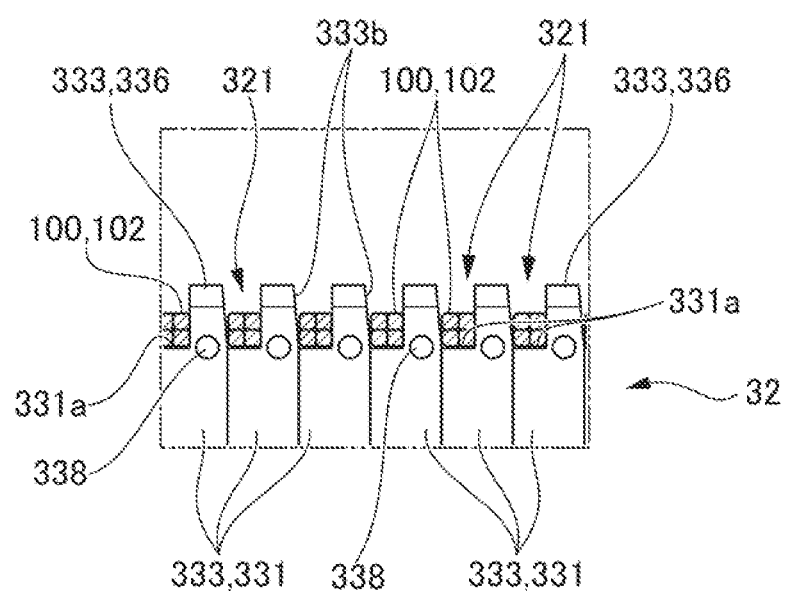
FIG. 9 is an enlarged view of a portion C in FIG. 1.

As shown in FIGS. 3, 8, and 9, in the conveyor 32 which is slidably disposed on the conveying rail 31, the first gripping claw 333 and the second gripping claw 336 are inserted into the gap between the straight portions 102 and 102 adjacent to each other in the length direction of the belt-shaped coil 100, and the straight portions 102 are accommodated in the respective gripping grooves 321, such that the belt-shaped coil 100 is gripped. Therefore, it is possible for the conveyor 32 to convey the belt-shaped coil 100 in a state of holding the straight portions 102 at regular intervals without positional deviation of the straight portions. As shown in FIGS. 2 and 3, the side ends 103 of the belt-shaped coil 100 protrude laterally on both sides in the moving direction of the conveyor 32. It should be noted that, in FIG. 1, the belt-shaped coil 100 to be gripped by the conveyor 32 is not shown.

Guide Member

As shown in FIG. 1, the guide members 4 are made by a metal belt-shaped plate material, and provided in a substantially U-shape laterally along the pivot conveying unit 313 of the conveying rail 31. In the guide members 4, the inside of the U-shaped portion is provided so as to face the direction of the coil winding jig 2 in the vicinity of the both ends of the coil winding jig 2 in the axial direction (the vertical direction relative to the plane of the paper of FIG. 1, and the left-right direction in FIG. 2) so as to sandwich the coil winding jig 2, and is fixed to the conveying rail 31.

The guide members 4 each include an introduction end 4a that introduces the side ends 103 of the belt-shaped coil 100 to be conveyed by the conveyor 32, a discharge end 4b that discharges the side ends 103 of the belt-shaped coil 100, and an inner wall surface 41 that guides the side ends 103 from the introduction end 4a over the discharge end 4b. The inner wall surface 41 has a curved surface which is curved smoothly and continuously along a range of approximately ½ the outer periphery of the coil winding jig 2 from the introduction end 4a over the discharge end 4b. The guide members 4 bring the side ends 103 introduced from the introduction end 4a into contact with the inner wall surface 41 while being pivotally conveyed by the pivot conveying unit 313, such that the entire belt-shaped coil 100 is smoothly guided in an arc shape along the outer periphery of the coil winding jig 2.

Figure 10:
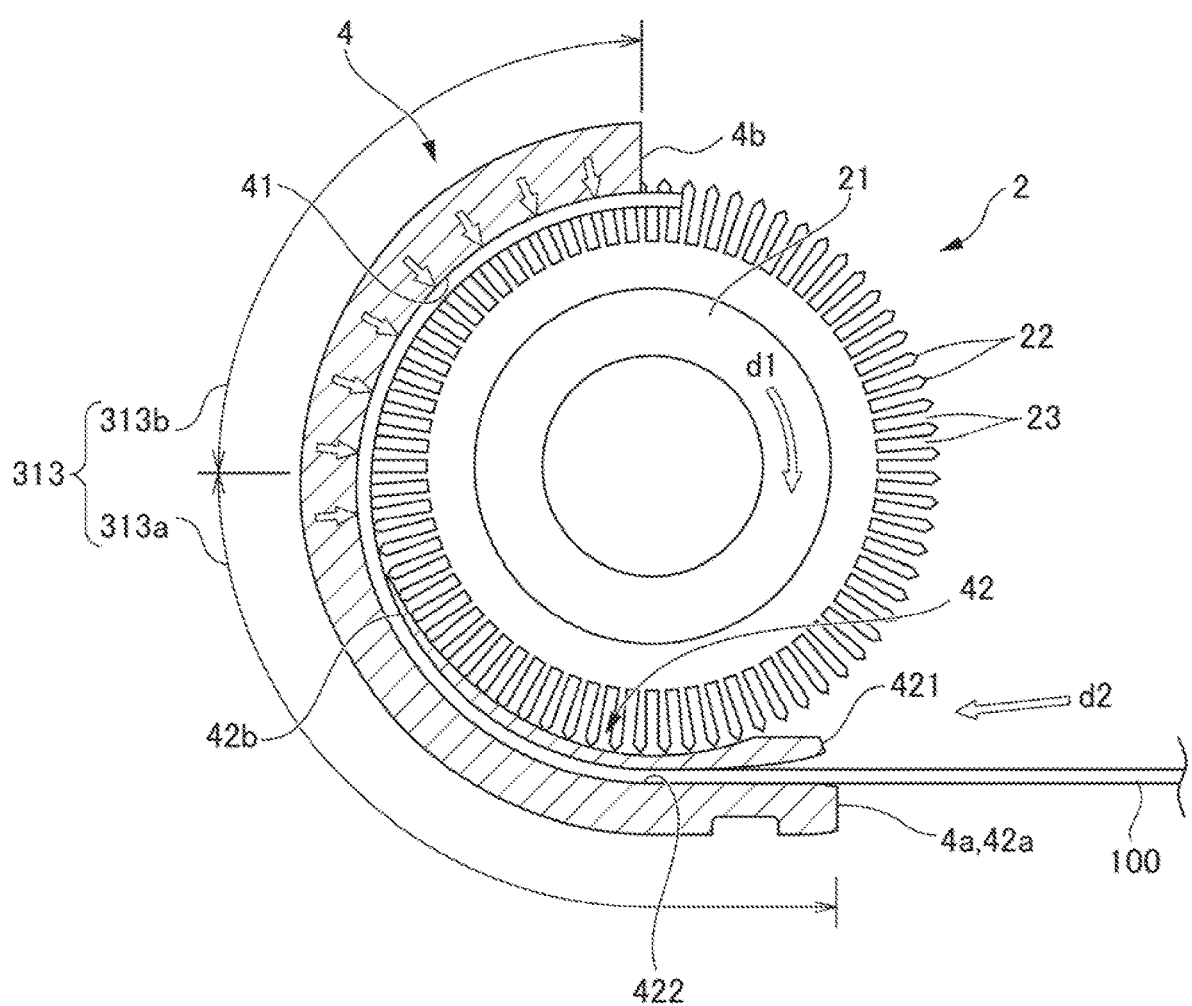
FIG. 10 is a cross-sectional view showing a state in which the belt-shaped coil is guided in an arc shape to the coil winding jig by a guide member.
Figure 11:
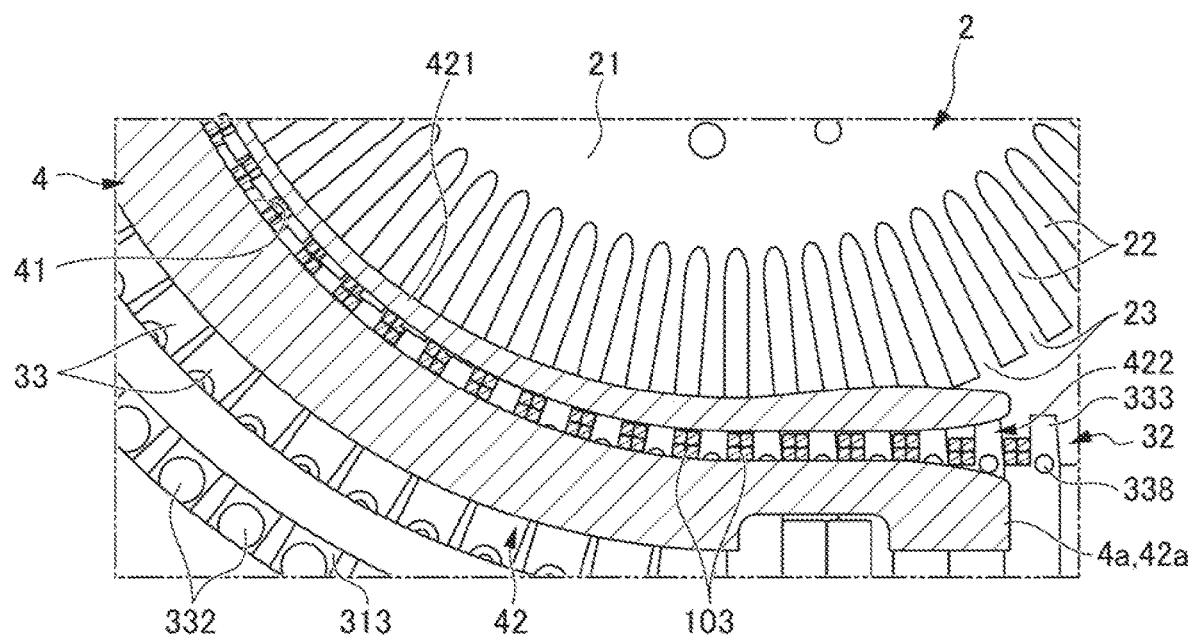
FIG. 11 is an enlarged cross-sectional view of a portion D in FIG. 1.

The curvature of the arcuate inner wall surface 41 of the guide member 4 greatly changes gradually toward the discharge end 4b from the introduction end 4a. More specifically, as shown in FIG. 10, the inner wall surface 41 at the introduction end 4a is disposed slightly outside the outer periphery of the coil winding jig 2 in the radial direction. However, the inner wall surface 41 is smoothly reduced gradually in diameter from the introduction end 4a toward the discharge end 4b. The inner wall surface 41 at the discharge end 4b is disposed inside the outer periphery of the coil winding jig 2 in the radial direction. Therefore, the inner wall surface 41 of the guide member 4 guides the belt-shaped coil 100 so as to be gradually rounded in an arc shape having a diameter smaller than the outer diameter of the coil winding jig 2, while being in contact with the side end 103 of the belt-shaped coil 100 as the belt-shaped coil 100 moves from the first half portion 313a to the second half portion 313b of the pivot conveying unit 313.

The belt-shaped coil 100 is gradually pressed toward the coil winding jig 2 by being guided by the inner wall surface 41 of the guide member 4 from the first half portion 313a toward the second half portion 313b of the pivot conveying unit 313. Thus, the straight portions 102 to be gripped by the conveyor 32 are forcibly disengaged so as to float from the gripping groove 321, and gradually move toward the inside of the comb-shaped groove 23 of the coil winding jig 2. The discharge end 4b of the guide member 4 is disposed inside the outer periphery of the coil winding jig 2 in the radial direction. Therefore, the straight portion 102 is completely inserted into the comb-shaped groove 23 of the coil winding jig 2. Thereafter, the belt-shaped coil 100 is wound on the coil winding jig 2 by the rotation of the coil winding jig 2. It should be noted that, in FIGS. 10 and 12, the conveyor 32 is not shown, and the belt-shaped coil 100 is shown in a simplified manner.

It should be noted that the guide members 4 are not limited to the structure having the inner wall surface 41 which is continuous over the entire pivot conveying unit 313 as in the present embodiment. For example, although not shown, the guide member 4 may have a structure in which a plurality of guide rollers are arranged along the pivot conveying unit 313. However, in order for the belt-shaped coil 100 to be guided continuously to the comb-shaped groove 23 of the coil winding jig 2 such that the straight portions 102 can be smoothly inserted into the comb-shaped groove 23, it is preferable that the guide members 4 each have an inner wall surface 41 to be in contact with the side ends 103 at its wall surface in the second half portion 313b of the pivot conveying unit 313. In order for the belt-shaped coil 100 to be smoothly guided in an arc shape over the entire pivot conveying unit 313 such that the straight portions 102 can be smoothly inserted into the comb-shaped groove 23 of the coil winding jig 2, it is preferable that the guide members 4 each have an inner wall surface 41 to be in contact with the side end 103 at its wall surface in the entire pivot conveying unit 313, as in the present embodiment.

As shown in FIGS. 1 and 2, a pair of reforming portions 42 are provided in the vicinity of the introduction end 4a of the guide member 4. The pair of reforming portion 42 forcibly deforms and reform the belt-shaped coil 100 to be introduced to the pivot conveying unit 313 so as to be curved in an arc shape along the outer periphery of the coil winding jig 2. In the guide members 4, the range in which the reforming portion 42 is provided is within the range of the first half portion 313a of the pivot conveying unit 313. More specifically, the reforming portion 42 can be provided, for example, over the range of about ½ to about ¾ the first half portion 313a of the pivot conveying unit 313 from the introduction end 4a of the guide member 4.

The reforming portion 42 includes the inner wall surface 41 and the guide plate 421 of the guide member 4. The guide plate 421 curves smoothly in an arc shape along the curvature of the inner wall surface 41 of the guide member 4. Similarly to the guide members 4, the guide plate 421 is provided so as to sandwich the coil winding jig 2 from both ends in the axial direction, and is fixed to the guide member 4. The reforming portion 42 includes a reforming groove 422 that sandwiches the side ends 103 between the inner wall surface 41 and the guide plate 421. The inner wall surface 41 in the reforming portion 42 is in contact with the outer surface of the side end 103 of the belt-shaped coil 100 in the radial direction, and supports the outer surface, while the guide plate 421 is in contact with the inner surface of the side end 103 of the belt-shaped coil 100 in the radial direction, and supports the inner surface.

The reforming portion 42 receives and sandwiches the side ends 103 of the belt-shaped coil 100 introduced to the introduction end 4a of the guide member 4 in the reforming groove 422, while conveying them, such that the side ends 103 are forcibly deformed so as to be curved in an arc shape. Thus, the belt-shaped coil 100 is reformed in an arc shape in the initial introducing stage of the pivot conveying unit 313 before being wound on the coil winding jig 2, and thereafter, the force that tends to elastically return to flat is suppressed while being guided in an arc shape by the inner wall surface 41 of the guide member 4. Therefore, the belt-shaped coil 100 is guided in an arc shape by the guide members 4, and is smoothly and accurately provided in a substantially cylindrical wound state.

Coil Forming Method

Next, a method of forming the belt-shaped coil 100 into a substantially cylindrical wound state by the coil forming apparatus 1 will be described.

First, the coil winding jig 2 is provided to be rotatable by the driving of a motor (not shown) inside the U-shaped portion of the conveying rail 31 of the coil forming apparatus 1 (coil winding jig providing step).

After the coil winding jig 2 is provided in the coil forming apparatus 1, the belt-shaped coil 100 which is formed in advance in a long corrugated belt shape is supplied to the conveyor 32 which is provided in the straight conveying unit 311 on the lower side of the conveying rail 31 by a coil feeding device or an operator (not shown). The belt-shaped coil 100 is gripped by the conveyor 32 by inserting the first gripping claws 333 and the second gripping claws 336 of the respective piece members 33 of the conveyor 32 into the gaps between the adjacent straight portions 102 and 102, and by accommodating the straight portions 102 in the gripping grooves 321, respectively.

Thereafter, the conveyor 32 gripping the base-shaped coil 100 is pressed by a conveyer pressing device (not shown) or an operator, and the straight conveying unit 311 is moved toward the coil winding jig 2 so that the meshing groove 333a of the piece member 33 and the engaging portion 22a of the coil winding jig 2 are engaged with each other. When the coil winding jig 2 is rotationally driven in the direction d1 after the meshing groove 333a and the engaging portion 22a are meshed with each other immediately below the coil winding jig 2, the conveyor 32 moves the conveying rail 31 along the direction d2 in synchronization with the rotation of the coil winding jig 2, and pivotally conveys the belt-shaped coil 100 along the outer periphery of the coil winding jig 2.

When the conveyor 32 reaches the pivot conveying unit 313, the side ends 103 of the belt-shaped coil 100 is first introduced into the reforming groove 422 of the reforming portion 42 from the introduction end 4a of the guide member 4, and is pivotally conveyed while being sandwiched between the inner wall surface 41 and the guide plate 421. Thus, the belt-shaped coil 100 is forcibly deformed and reformed so as to be curved in an arc shape along the reforming groove 422 (reforming step).

The belt-shaped coil 100 passing through the reforming portion 42 is guided so as to be gradually rounded in an arc shape while being pivotally conveyed along at least a portion of the outer periphery of the coil winding jig 2 along the inner wall surface 41 of the guide member 4, specifically, a range of approximately ½ the outer periphery of the coil winding jig 2, accompanied with the rotation of the coil winding jig 2 (guiding step).

Since the curvature of the inner wall surface 41 of the guide member 4 gradually increases from the first half portion 313a to the second half portion 313b of the pivot conveying unit 313, the side ends 103 of the belt-shaped coil 100 is pressed by the inner wall surface 41 so as to gradually decrease the diameter inwardly in the radial direction. Thus, the belt-shaped coil 100 is rounded to have a smaller diameter than the outer diameter of the coil winding jig 2. The side end 103 which is pressed against the inner wall surface 41 gradually separates the straight portions 102 from the gripping grooves 321 toward the comb-shaped groove 23 of the coil winding jig 2 as the belt-shaped coil 100 approaches the discharge end 4b of the guide member 4. As shown in FIG. 10, the straight portions 102 completely detached from the gripping grooves 321 are inserted into the respective comb-shaped grooves 23 of the coil winding jig 2 in communication with the gripping grooves 321, while being pressed against the inner wall surface 41 of the guide member 4 (inserting step). Thereafter, the belt-shaped coil 100 is discharged from the discharge end 4b of the guide member 4 while being wound on the coil winding jig 2, accompanying rotation of the coil winding jig 2.

Figure 12:
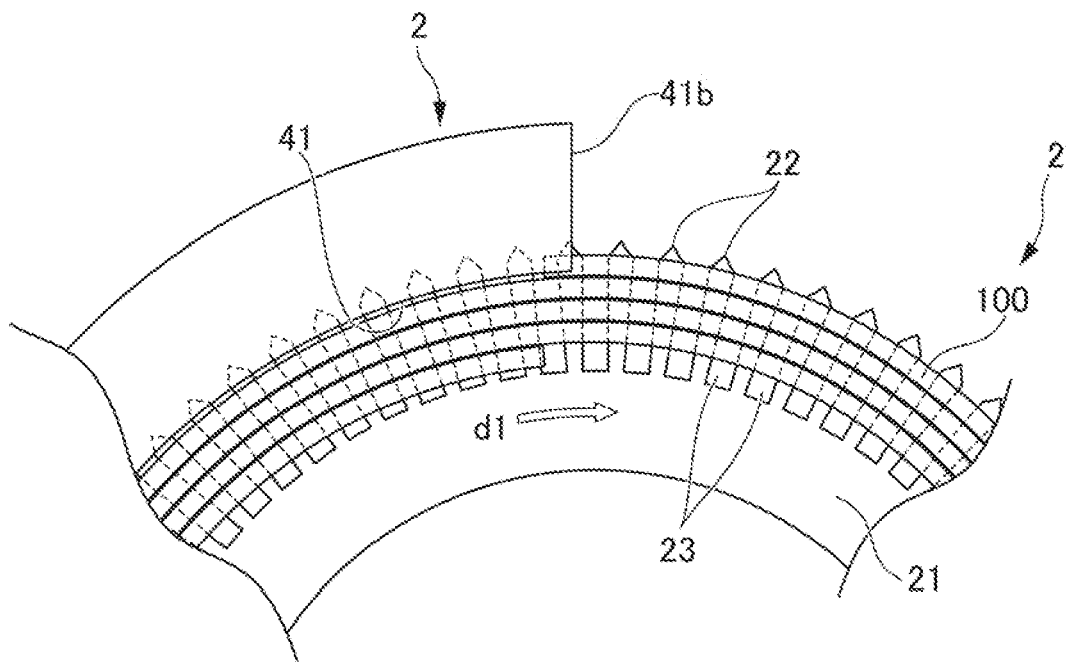
FIG. 12 is a partially enlarged view showing a state in which the belt-shaped coil is wound repeatedly along the coil winding jig.
Figure 13:
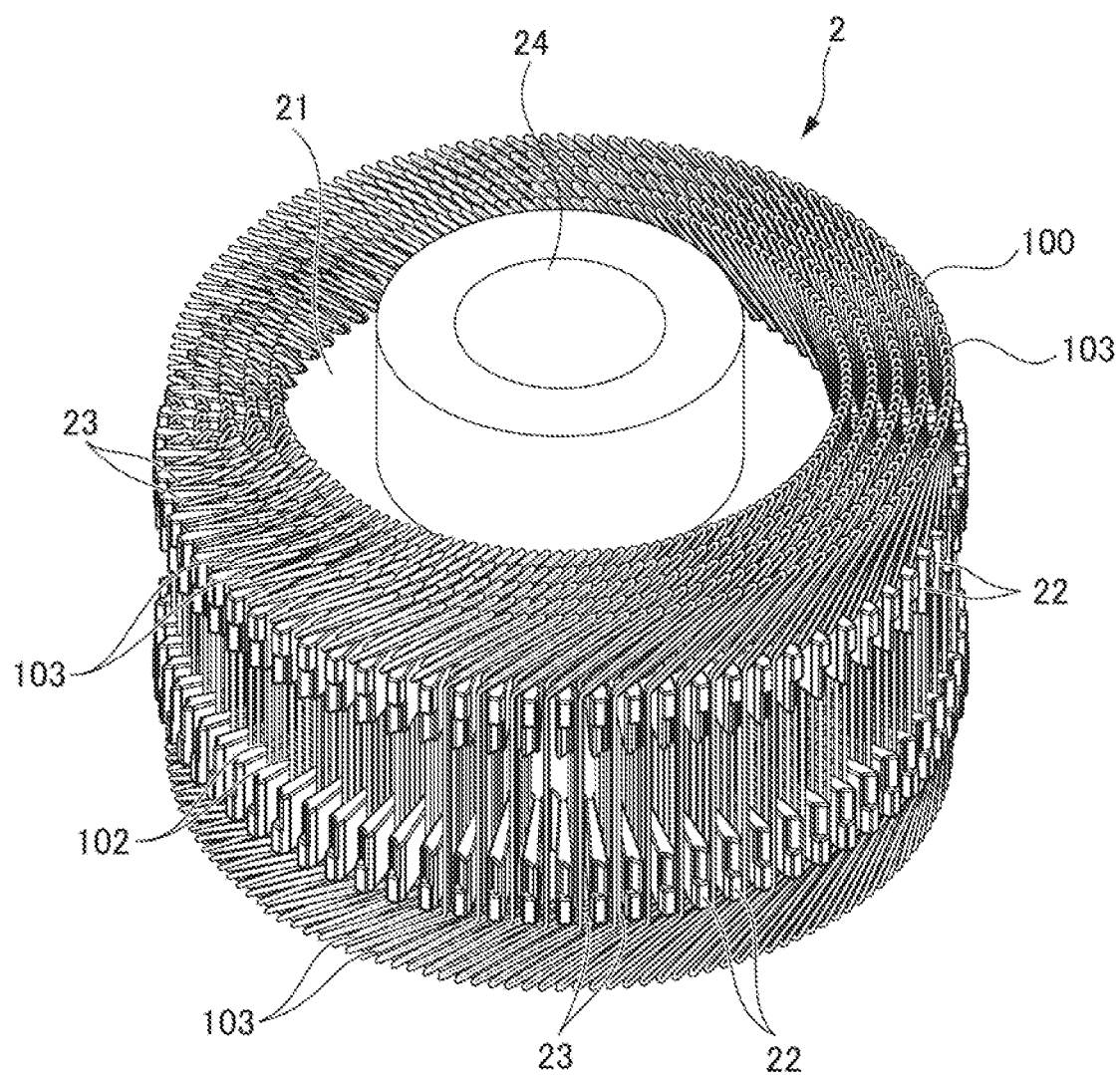
FIG. 13 is a perspective view showing a state in which the belt-shaped coil is formed in a wound state along the coil winding jig.

When the entire conveyor 32 finishes moving along the conveying rail 31, the straight portions 102 of the belt-shaped coil 100 are inserted into the comb-shaped groove 23 in a multilayer shape, such that, as shown in FIG. 12, the belt-shaped coil 100 is repeatedly wound around the coil winding jig 2 four times. Thus, as shown in FIG. 13, the belt-shaped coil 100 is easily formed in a substantially cylindrical wound state. Since the straight portions 102 of the belt-shaped coil 100 in the wound state are accommodated in the comb-shaped groove 23, there is no risk of positional deviation of the straight portions. Therefore, the belt-shaped coil 100 can stably hold a substantially cylindrical wound state. It should be noted that the belt-shaped coil is not limited to a coil wound repeatedly on the coil winding jig 2.

The coil forming apparatus 1 described above achieves the following advantageous effects. That is, the coil forming apparatus 1 forms the belt-shaped coil 100 in a wound state, and the belt-shaped coil 100 includes the plurality of straight portions 102 and the side ends 103 provided on both ends of the plurality of straight portions 102. The coil forming apparatus 1 includes: the coil winding jig 2 including the plurality of comb-shaped grooves 23, the coil winding jig being configured to wind the belt-shaped coil 100 by inserting the plurality of straight portions 102 of the belt-shaped coil 100 into a respective one of the plurality of comb-shaped grooves 23; the coil conveying mechanism unit 3 that pivotally conveys the belt-shaped coil 100; and guide members 4 that are provided in the vicinity of both ends 103 of the coil winding jig 2 in the axial direction, and guide the belt-shaped coil 100 in an arc shape while being in contact with the side ends 103 of the belt-shaped coil 100, and further allow the plurality of straight portions 102 to be inserted into a respective one of the plurality of comb-shaped grooves 23 in the second half portion 313b of the pivot conveying unit 313 that pivotally conveys the belt-shaped coil 100. The coil conveying mechanism unit 3 includes the conveying rail 31 that provides a conveying path pivotally conveying the belt-shaped coil 100 along the coil winding jig 2, and the conveyor 32 that moves along the conveying rail 31 in a state gripping the plurality of straight portions 102 of the belt-shaped coil 100. With such a configuration, it is possible to grip the straight portions 102 without positional deviation, and conveys the belt-shaped coil 100 toward the coil winding jig 2. Furthermore, it is possible to continuously insert the straight portions 102 of the belt-shaped coil 100 into the comb-shaped grooves 23 of the coil winding jig 2 while guiding the side ends 103 of the belt-shaped coil 100 by the guide members 4, thereby winding the belt-shaped coil 100 on the coil winding jig 2. Therefore, it is possible to form the belt-shaped coil 100 in an wound state easily.

The conveyor 32 of the present embodiment includes the plurality of piece members 33 that are stacked in the direction d2 which is a conveying direction of the belt-shaped coil 100, and each grip respective one of the plurality of straight portions 102. The plurality of piece members 33 are rotatably coupled to each other with the first gripping claws 333 and the second gripping claws 336 which are the portion gripping the plurality of straight portions 102 as a reference, accompanying pivot conveying of the belt-shaped coil 100. With such a configuration, since the plurality of piece members 33 of the conveyor 32 are rotatably coupled to each other with the first gripping claws 333 and the second gripping claws 336 gripping the plurality of straight portions 102 as a reference, it is possible to pivotally convey the belt-shaped coil 100 smoothly in an arc shape.

The conveying rail 31 of the present embodiment includes the guide grooves 314 that provide a travel path of the conveyor 32. The plurality of piece members 33 each include the guide projections 332 which are engaged with a respective one of the guide grooves 314 at the lower end which is the opposite end to the portion gripping the plurality of straight portions 102. With such a configuration, it is possible to move the conveyor 32 conveying the belt-shaped coil 100 along the conveying rail 31 smoothly by engaging the guide projections 332 of the piece members 33 of the conveyor 32 with the guide grooves 314 of the conveying rail 31, respectively.

The coil winding jig 2 includes the plurality of comb-shaped grooves 23 on the outer periphery of the coil winding jig. The guide members 4 guide the belt-shaped coil 100 in an arc shape having a smaller diameter than the outer diameter of the coil winding jig 2 toward the second half portion 313b of the pivot conveying unit 313 that pivotally conveys the belt-shaped coil 100, and allow the plurality of straight portions 102 to be inserted into a respective one of the plurality of comb-shaped grooves 23 in the second half portion 313b of the pivot conveying unit 313 that pivotally conveys the belt-shaped coil 100. With such a configuration, since it is possible to guide the belt-shaped coil 100 to allow the straight portions 102 to be inserted into the comb-shaped grooves 23 of the coil winding jig 2 while guiding the side ends 103 of the belt-shaped coil 100 by the guide members 4, it is possible to insert the straight portions 102 of the belt-shaped coil 100 into the comb-shaped grooves 23 of the coil winding jig 2 smoothly.

The guide members 4 of the present embodiment each include the inner wall surface 41 which is a wall surface to be in contact with the side end 103 in the second half portion 313*b* of the pivot conveying unit 313 that pivotally conveys the belt-shaped coil 100. With such a configuration, since the side ends 103 of the belt-shaped coil 100 are guided to the comb-shaped grooves 23 of the coil winding jig 2 by the inner wall surface 41 in the second half portion 313*b* of the pivot conveying unit 313, it is possible to smoothly guide the straight portions 102 of the belt-shaped coil 100 to the comb-shaped grooves 23 of the coil winding jig 2.

The guide members 4 according to the present embodiment each include the inner wall surface 41 which is a wall surface to be in contact with the side end 103 in the entire pivot conveying unit 313 that pivotally conveys the belt-shaped coil 100. With such a configuration, since the side ends 103 of the belt-shaped coil 100 are guided by the inner wall surface 41 over the entire pivot conveying unit 313, it is possible to guide the belt-shaped coil 100 along the outer periphery of the coil winding jig 2, and smoothly insert the straight portions 102 of the belt-shaped coil 100 to the comb-shaped grooves 23 of the coil winding jig 2.

The guide members 4 of the present embodiment include the reforming portion 42 in the first half portion 313*a* of the pivot conveying unit 313 that pivotally conveys the belt-shaped coil 100, and the reforming portion 42 deforms and reforms the belt-shaped coil 100 in an arc shape in a state sandwiching the side ends 103 of the belt-shaped coil 100. With such a configuration, since it is possible to reform the belt-shaped coil 100 in an arc shape in the first half portion 313*a* of the pivot conveying unit 313 prior to winding the belt-shaped coil 100 in the coil winding jig 2, it is possible to form the belt-shaped coil 100 accurately and easily in a wound state.

The coil forming method described above has the following advantageous effects. That is, the coil forming method according to the present embodiment forms the belt-shaped coil 100 in a wound state, and the belt-shaped coil 100 includes the plurality of straight portions 102 and the side ends 103 provided on both ends of the plurality of straight portions 102. The coil forming method includes the coil conveying step of pivotally conveying the belt-shaped coil 100 along the coil winding jig 2 in a state gripping the plurality of straight portions 102, the coil winding jig 2 including the plurality of comb-shaped grooves 23, each of which can hold a respective one of the plurality of straight portions 102 therein, and being configured to wind the belt-shaped coil 100, and the guiding step of providing guide members 4 in the vicinity of both ends 103 of the coil winding jig 2 in the axial direction, guiding the belt-shaped coil 100 so as to be in an arc shape while the guiding members 4 are in contact with the side ends 103 of the belt-shaped coil 100 to be pivotally conveyed, and allowing the plurality of straight portions 102 to be inserted into a respective one of the plurality of comb-shaped grooves 23 of the coil winding jig 2. With such a configuration, it is possible to grip the straight portions 102 without positional deviation of the straight portions 102 and convey the belt-shaped coil 100 toward the coil winding jig 2, as well as continuously inserting the straight portions 102 of the belt-shaped coil 100 into the comb-shaped grooves 23 of the coil winding jig 2 while guiding the side ends 103 of the belt-shaped coil 100 by the guide members 4, thereby winding the belt-shaped coil 100 on the coil winding jig 2. Therefore, it is possible to form the belt-shaped coil 100 easily in a wound state.

The coil winding jig 2 includes the plurality of comb-shaped grooves 23 on the outer periphery of the coil winding jig 2. The guiding step further includes guiding the belt-shaped coil 100 in an arc shape having a smaller diameter than the outer diameter of the coil winding jig 2 toward the second half portion 313*b* of the pivot conveying unit 313 that pivotally conveys the belt-shaped coil 100, and allowing the plurality of straight portions 102 to be inserted into a respective one of the plurality of comb-shaped grooves 23 in the second half portion 313*b* of the pivot conveying unit 313 that pivotally conveys the belt-shaped coil 100. With such a configuration, since it is possible to guide the belt-shaped coil 100 to allow the straight portions 102 to be inserted into the comb-shaped grooves 23 of the coil winding jig 2 while guiding the side ends 103 of the belt-shaped coil 100 by the guide members 4, it is possible to insert the straight portions 102 of the belt-shaped coil 100 into the comb-shaped grooves 23 of the coil winding jig 2 smoothly.

The guiding step of the present embodiment further includes guiding the side ends 103 by the inner wall surface 41 which is a wall surface of each of the guide members 4 in the second half portion 313*b* of the pivot conveying unit 313 that pivotally conveys the belt-shaped coil 100. With such a configuration, since the side ends 103 of the belt-shaped coil 100 are guided to the comb-shaped grooves 23 of the coil winding jig 2 by the inner wall surface 41 in the second half portion 313*b* of the pivot conveying unit 313, it is possible to guide the straight portions of the belt-shaped coil 100 to the comb-shaped grooves 23 of the coil winding jig 2 smoothly.

The guiding step of the present embodiment further includes guiding the side ends 103 by the inner wall surface 41 which is a wall surface of each of the guide members 4 in the entire pivot conveying unit 313 that pivotally conveys the belt-shaped coil 100. With such a configuration, since the side ends of the belt-shaped coil 100 is guided by the inner wall surface 41 over the entire pivot conveying unit 313, it is possible to smoothly guide the belt-shaped coil 100 along the outer periphery of the coil winding jig 2, and guide the straight portion 102 of the belt-shaped coil 100 smoothly to the comb-shaped grooves 23 of the coil winding jig 2.

The guiding step of the present embodiment further includes the reforming step of deforming and reforming the belt-shaped coil 100 in an arc shape in a state sandwiching the side ends 103 of the belt-shaped coil 100 by the guide members 4 in the first half portion 313*a* of the pivot conveying unit 313 that pivotally conveys the belt-shaped coil 100. With such a configuration, since it is possible to reform the belt-shaped coil 100 in an arc shape in the first half portion 313*a* of the pivot conveying unit 313 prior to winding the belt-shaped coil 100 on the coil winding jig 2, it is possible to form the belt-shaped coil 100 accurately and easily in a wound state.

EXPLANATION OF REFERENCE NUMERALS

1 Coil forming apparatus
2 Coil winding jig
23 Comb-shaped groove
3 Coil conveying mechanism unit
31 Conveying rail
313 Pivot conveying unit
313*a* First half portion
313*b* Second half portion 314 Guide groove
32 Conveyor
33 Piece member
333 First gripping claw
336 Second gripping claw
4 Guide member
41 Inner wall surface
42 Reforming portion
100 Belt-shaped coil
102 Straight portion
103 Side end

What is claimed is:

1. A coil forming apparatus that forms a belt-shaped coil in a wound state, the belt-shaped coil including a plurality of straight portions and side ends provided on both ends of the plurality of straight portions, the apparatus comprising:
    a coil winding jig including a jig body with an outer circumference arranged between axial ends of the coil winding jig and including a plurality of comb-shaped grooves, the coil winding jig being configured to wind the belt-shaped coil by inserting the plurality of straight portions of the belt-shaped coil into a respective one of the plurality of comb-shaped grooves as the coil winding jig is rotated;
    a coil conveying organizer that pivotally conveys the belt-shaped coil along the outer circumference of the jig body, wherein the coil conveying organizer includes a conveying rail that provides a conveying path pivotally conveying the belt-shaped coil along the outer circumference of the jig body and a conveyor that moves along the conveying rail in a state gripping the plurality of straight portions of the belt-shaped coil; and
    guide members that are provided in a vicinity of both axial ends of the coil winding jig and guide the belt-shaped coil in an arc shape while being in contact with the side ends of the belt-shaped coil to insert the plurality of straight portions held by the conveyor into a respective one of the plurality of comb-shaped grooves in a second half portion of the coil conveying organizer upon pivot conveyance.

2. The coil forming apparatus according to claim 1, wherein
    the conveyor includes a plurality of piece members that are stacked in a conveying direction of the belt-shaped coil, and each grip a respective one of the plurality of straight portions, and
    the plurality of piece members are rotatably coupled to each other with a portion gripping the plurality of straight portions accompanying pivot conveying of the belt-shaped coil.

3. The coil forming apparatus according to claim 2, wherein
    the conveying rail includes guide grooves that provide a travel path of the conveyor, and
    the plurality of piece members each include guide projections which are engaged with a respective one of the guide grooves at an opposite end to the portion gripping the plurality of straight portions.

4. The coil forming apparatus according to claim 1, wherein
    the coil winding jig includes the plurality of comb-shaped grooves on an outer periphery of the coil winding jig, and
    the guide members guide the belt-shaped coil in an arc shape having a smaller diameter than an outer diameter of the coil winding jig toward the second half portion of the coil conveying organizer upon pivot conveying, and allow the plurality of straight portions to be inserted into a respective one of the plurality of comb-shaped grooves in the second half portion of the coil conveying organizer upon pivot conveying.

5. The coil forming apparatus according to claim 1, wherein the guide members each include a wall surface to be in contact with the side ends of the belt-shaped coil in the second half portion of the coil conveying organizer upon pivot conveyance.

6. The coil forming apparatus according to claim 1, wherein the guide members each include a wall surface to be in contact with the side ends of the belt-shaped coil along an entire length of the coil conveying organizer upon pivot conveyance.

7. The coil forming apparatus according to claim 1, wherein the guide members include a reforming portion in a first half portion of the coil conveying organizer upon pivot conveyance, and the reforming portion deforms and reforms the belt-shaped coil in an arc shape in a state sandwiching the side ends of the belt-shaped coil.

* * * * *